(12) United States Patent
Wang et al.

(10) Patent No.: US 11,163,848 B2
(45) Date of Patent: *Nov. 2, 2021

(54) INFORMATION RESOURCE COLLECTION METHOD, DEVICE, AND COMPUTER-READABLE STORAGE MEDIUM

(71) Applicant: Beijing Xiaomi Mobile Software Co., Ltd., Beijing (CN)

(72) Inventors: Biwen Wang, Beijing (CN); Bin Wang, Beijing (CN); Bo Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 439 days.

This patent is subject to a terminal disclaimer.

(21) Appl. No.: 15/988,757

(22) Filed: May 24, 2018

(65) Prior Publication Data
US 2018/0341715 A1   Nov. 29, 2018

(30) Foreign Application Priority Data

May 25, 2017 (CN) .......................... 201710380417.9

(51) Int. Cl.
*G06F 16/955* (2019.01)
*G06F 16/13* (2019.01)
(Continued)

(52) U.S. Cl.
CPC .......... *G06F 16/9562* (2019.01); *G06F 9/542* (2013.01); *G06F 16/13* (2019.01);
(Continued)

(58) Field of Classification Search
CPC .... G06F 16/9562; G06F 16/13; G06F 16/168; G06F 16/287; G06F 9/542; G06F 3/0481;
(Continued)

(56) References Cited

U.S. PATENT DOCUMENTS 6,208,995 B1 * 3/2001 Himmel ............. G06F 16/9562
6,546,393 B1 * 4/2003 Khan .................. G06F 16/9562
(Continued)

FOREIGN PATENT DOCUMENTS

CN      101820600 A     9/2010
CN      102724594 A     10/2012
(Continued)

OTHER PUBLICATIONS

Combined Chinese Office Action and Search Report dated Feb. 3, 2020 in Chinese Patent Application No. 201710380417.9, 8 pages.
(Continued)

*Primary Examiner* — Aleksandr Kerzhner
*Assistant Examiner* — Maher N Algibhah
(74) *Attorney, Agent, or Firm* — Oblon, McClelland, Maier & Neustadt, L.L.P.

(57) ABSTRACT

The disclosure relates to an information resource collection method, device and computer-readable storage medium. The method includes receiving a broadcast message sent by an application program of a plurality of application programs through a system interface that is configured to direct each of the plurality of application programs to report an occurrence of collection events to an operating system; analyzing the broadcast message to obtain key information of an information resource; obtaining the key information of the information resource; and storing the key information of the information resource in a unified favorite folder that is configured to store and display key information of a plurality of collected information resources that has been collected via the system interface from at least one of the plurality of application programs.

20 Claims, 20 Drawing Sheets

(51) Int. Cl.
    *G06F 16/16*     (2019.01)
    *G06F 16/28*     (2019.01)
    *G06F 9/54*     (2006.01)
    *G06F 3/0481*     (2013.01)

(52) U.S. Cl.
    CPC .......... *G06F 16/168* (2019.01); *G06F 16/287* (2019.01); *G06F 3/0481* (2013.01)

(58) Field of Classification Search
    CPC ........ G06F 16/955; G06F 16/16; G06F 16/28; G06F 9/54
    See application file for complete search history.

(56) References Cited

U.S. PATENT DOCUMENTS

| | | | | |
|---|---|---|---|---|
| 9,171,287 | B2* | 10/2015 | Sorg | G06F 40/134 |
| 2004/0064543 | A1* | 4/2004 | Ashutosh | G06Q 40/06 |
| | | | | 709/224 |
| 2012/0210211 | A1 | 8/2012 | Min et al. | |
| 2013/0332806 | A1* | 12/2013 | Forstall | G06F 16/9562 |
| | | | | 715/205 |
| 2014/0359488 | A1* | 12/2014 | Bahna | G06F 16/9562 |
| | | | | 715/760 |

FOREIGN PATENT DOCUMENTS

| | | |
|---|---|---|
| CN | 102739562 A | 10/2012 |
| CN | 102880654 A | 1/2013 |
| CN | 103577482 A | 2/2014 |
| CN | 103986842 A | 8/2014 |
| CN | 105308590 A | 2/2016 |
| CN | 106095985 A | 11/2016 |

OTHER PUBLICATIONS

Extended European Search Report dated May 4, 2018 in Patent Application No. 18155366.0, 10 pages.
Combined Chinese Office Action and Search Report dated Sep. 2, 2020, in Patent Application No. 201710380417.9 (with English translation of Categories of Cited Documents), 8 pages.

* cited by examiner

INFORMATION RESOURCE COLLECTION METHOD, DEVICE, AND COMPUTER-READABLE STORAGE MEDIUM

CROSS-REFERENCE TO RELATED APPLICATIONS

The present application is based upon and claims priority to Chinese Patent Application No. 201710380417.9, filed on May 25, 2017, the entire contents of which are incorporated herein by reference.

TECHNICAL FIELD

The present disclosure generally relates to the field of Internet technology, and more particularly, to an information resource collection method, device, and computer-readable storage medium.

BACKGROUND

A collection function of information associated with a user's Internet behavior may perform personalized information resource arrangement for each user so that a user can quickly and easily once again find information resources on which he or she focus attention without having to filter large information resources every time. As a result, such a collection function significantly enhances the user's experience.

When information resource collection is performed, it is usually realized by a collection access respectively provided by an application for a user. For example, when a user browses an article in a news application, a current page may directly display a virtual collection key, or a user invokes the virtual collection key by performing an operation, such as clicking on the right upper corner of a current page. If a user clicks on the virtual collection key, it is possible to successfully collect and categorize the article as a user's favorite within the application.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an information resource collection method. The method includes receiving a broadcast message sent by an application program of a plurality of application programs through a system interface that is configured to direct each of the plurality of application programs to report an occurrence of collection events to an operating system; analyzing the broadcast message to obtain key information of an information resource; obtaining the key information of the information resource; and storing the key information of the information resource in a unified favorite folder that is configured to store and display key information of a plurality of collected information resources that has been collected via the system interface from at least one of the plurality of application programs.

According to an aspect, the method further includes displaying a collection completion notification message of the information resource on a top layer; detecting a click operation on the collection completion notification message; switching to the system interface; and displaying the unified favorite folder on a designated area of the system interface after detecting the click operation on the collection completion notification message, wherein the key information is located at a top position of the designated area.

According to another aspect, the method further includes displaying a detail presentation key on the designated area of the unified favorite folder; detecting a click operation on the detail presentation key; and displaying the key information of the plurality of collected information resources stored in the unified favorite folder in an order from most recent to least recent according to collection time after detecting the click operation on the detail presentation key, wherein key information of most recent collected information resources of the plurality of collected information resources is displayed at a top position of a page, and key information of less recent collected information resources of the plurality of collected information resources is displayed at a bottom position of the page.

According to yet another aspect, the method further includes detecting a sliding operation on the page; and displaying, in a scrolling manner, key information of information resources that are different from the plurality of collected information resources in the unified favorite folder upon detection of the sliding operation.

According to yet another aspect, the method further includes determining a number of the plurality of collected information resources displayable on the designated area based on a size of an area that is occupied by the unified favorite folder when the unified favorite folder is displayed; selecting a preset number of the plurality of collected information resources that are most recently collected and match the number of the plurality of collected information resources displayable on the designated area; and displaying key information of the preset number of the plurality of collected information resources on the designated area in an order from most recent to least recent according to collection time, wherein key information of most recent collected information resources of the preset number of the plurality of collected information resources is displayed at a top position of the designated area, and key information of less recent collected information resources of the plurality of collected information resources is displayed at a bottom position of the designated area.

According to yet another aspect, the method further includes detecting a select operation that is configured to select one of the preset number of the plurality of collected information resources; determining whether the selected information resource is a content of a page; after detecting the select operation and determining that the selected information resource is the content of the page, determining an application program from which the selected information resource originates based on address link information corresponding to the selected information resource; and opening the determined application program and displaying the selected information resource through the determined application program.

In an example, when determining the application program from which the selected information resource originates, the method includes determining the application program from which the selected information resource originates based on a domain name in the address link information corresponding to the selected information resource, wherein a list of correspondence relations between domain names and application programs is locally saved before determining the application program from which the selected information resource originates.

In another example, types of information resources including the plurality of collected information resources include at least on of web page content and non-web page content; when the information resource is the web page content, the key information includes title information of the information resource and an accompanying drawing of the information resource, and when the information resource is the non-web page content, the key information includes content keywords of the information resource.

According to an aspect, the method further includes detecting a select operation of the information resource; after detecting the select operation of the information resource, if the information resource is web page content, acquiring the information resource from a second server based on address link information corresponding to the information resource; re-typeset processing the information resource to obtain the information resource if the information resource is graph-text content; obtaining the information resource; and displaying the information resource through a network view assembly.

Aspects of the disclosure also provide an information resource collection device including circuitry. The circuitry is configured to receive a broadcast message sent by an application program of a plurality of application programs through a system interface that is configured to direct each of the plurality of application programs to report an occurrence of collection events to an operating system; analyze the broadcast message to obtain key information of an information resource; obtain the key information of the information resource; and store the key information of the information resource in a unified favorite folder that is configured to store and display key information of a plurality of collected information resources that has been collected via the system interface from at least one of the plurality of application programs.

Aspects of the disclosure also provide an information resource collection device including a processor and a memory for storing instructions executable by the processor. The processor is configured to receive a broadcast message sent by an application program of a plurality of application programs through a system interface that is configured to direct each of the plurality of application programs to report an occurrence of collection events to an operating system; analyze the broadcast message to obtain key information of an information resource; obtain the key information of the information resource; and store the key information of the information resource in a unified favorite folder that is configured to store and display key information of a plurality of collected information resources that has been collected via the system interface from at least one of the plurality of application programs.

Aspects of the disclosure also provide a non-transitory computer-readable storage medium having stored therein computer program instructions that, when executed by one or more processors of a terminal, cause the terminal to receive a broadcast message sent by an application program of a plurality of application programs through a system interface that is configured to direct each of the plurality of application programs to report an occurrence of collection events to an operating system; analyze the broadcast message to obtain key information of an information resource; obtain the key information of the information resource; and store the key information of the information resource in a unified favorite folder that is configured to store and display key information of a plurality of collected information resources that has been collected via the system interface from at least one of the plurality of application programs.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Before detailed explanation of the aspects of the present disclosure, some nouns involved in the aspects of the present disclosure are first briefly introduced.

Figure 1A:
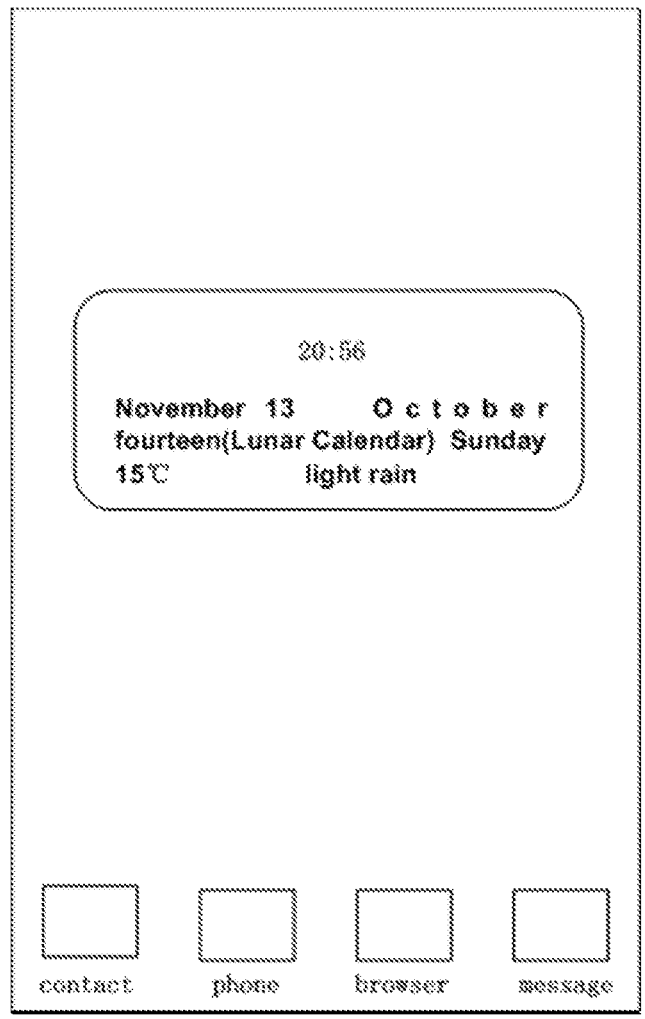
FIG. 1A is a schematic view showing an interface of a terminal according to an exemplary aspect of the present disclosure.
Figure 1B:
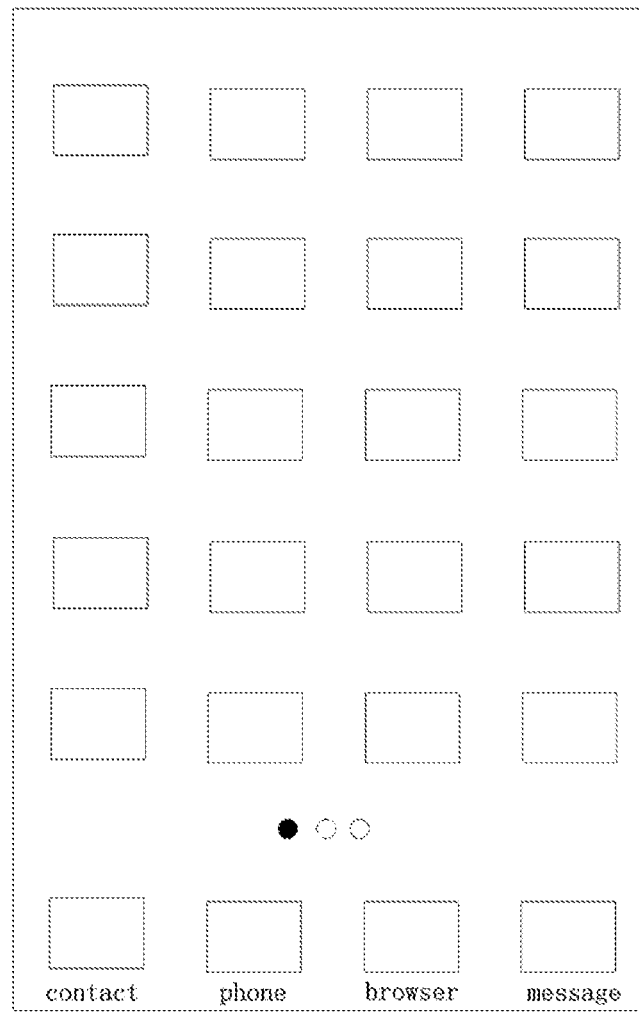
FIG. 1B is a schematic view showing an interface of a terminal according to an exemplary aspect of the present disclosure.
Figure 1C:
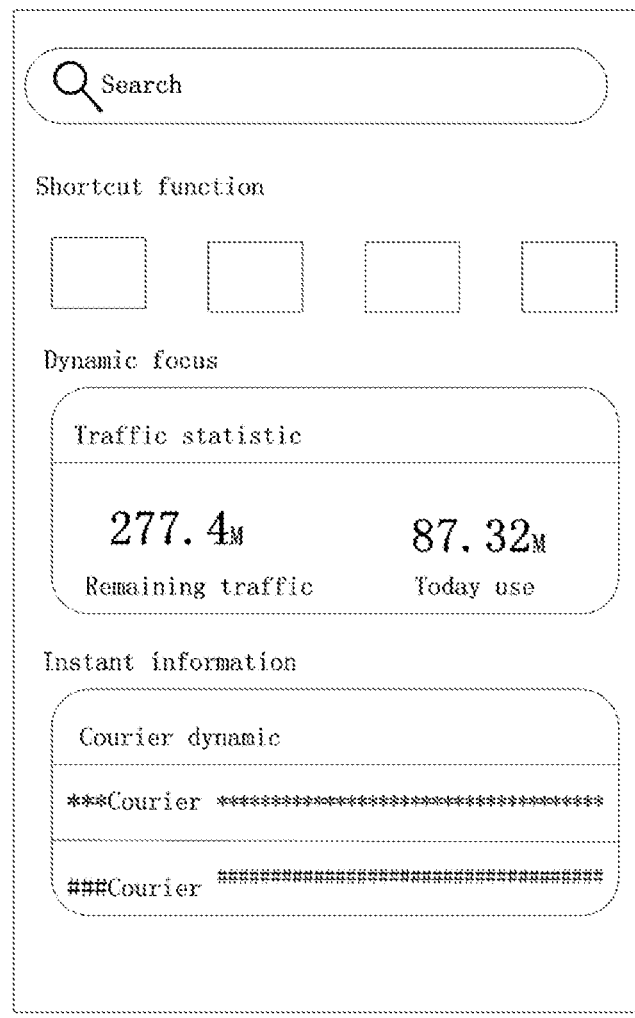
FIG. 1C is a schematic view showing an interface of a terminal according to an exemplary aspect of the present disclosure.

Designated interface: it may be a function interface on a terminal screen other than a main screen interface shown in FIG. 1A as well as an application interface for displaying installed application programs shown in FIG. 1B, i.e., MinusOneScreen interface. Among them, the MinusOneScreen interface is usually a function interface which is located at the leftmost among all the function interfaces on a terminal screen. When a rightward sliding operation is performed on a main screen interface, the MinusOneScreen interface may be evoked on the terminal screen. As shown in FIG. 1C, the content displayed on a MinusOneScreen interface for the time being is generally summarized into three categories: the first category is convenient access, the second category is instant recommendation, and the third category is dynamic focus.

Among them, convenient access gathers direct accesses of various application programs or functions, eliminates cumbersome steps of a user in regularly searching for an application program or function and helps a user to more effectively and reassuringly use the terminal by applying a recommended algorithm or direct function within an application program. Instant recommendation, which is generally closed related to a current scenario of a user, provides adequately valuable and timely content to the user when certain conditions (time, place, behavior within an application program, etc.) are triggered. For instance, it may include travel recommendation, courier tracking, music and radio, train tickets, air tickets, group purchase coupons, movie tickets, weather warning, daily greetings, schedule reminders, and the like. Dynamic focus provides an experience similar to desktop gadgets. For example, there are desktop gadgets such as traffic statistic or sports information.

In the aspects of the present disclosure, augmentation is made to the aforementioned dynamic focus by adding a desktop gadget having a collection function. This desktop gadget having a collection function, also known as a unified favorite or a unified favorite folder, may effectuate gathering information resources scattered in a favorite of each application program, so as to uniformly manage the gatheringly collected information resources of a plurality of application programs by this unified favorite.

Next, explanations are made in detail to the collection manner, display manner and searching manner of information resources mainly from four aspects.

A first aspect of the present disclosure includes a method for effectuating information resource collection by relying on an underlying capability of the system.

By using the collection manner, it is possible to effectively avoid for example the following several scenarios with a poor feeling of experience.

I. As the collected information resources are scattered at a favorite of each application program, when a search is made for certain information resource, it is possible to have the problem that a user may forget which application program has a favorite collecting the information resource, so that it is necessary to search throughout each application program.

II. Even if a user knows which application software has a favorite collecting the information resource, in order to search the information resource through the application program, it also requires a user to perform multi-step operations, for example, it is possible to require a user to successively perform such operations as to click on an application icon→click on a virtual key to enter a personal home page→click on a favorite on a personal home page.

Regarding a detailed realization process of the method for information resource collection by relying on an underlying capability of the system provided by the aspects of the present disclosure, please further refer to the following aspect.

Figure 2:
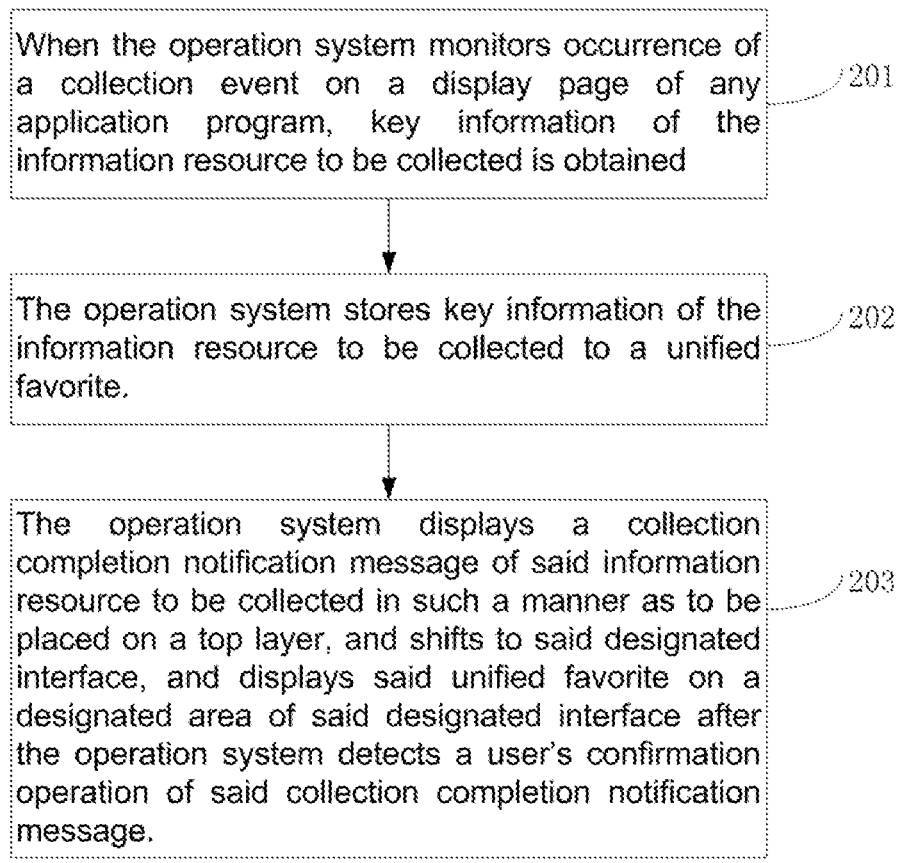
FIG. 2 is a flow chart showing a method for effectuating information resource collection by relying on an underlying capability of the system according to an exemplary aspect of the present disclosure.

With reference to FIG. 2, there is a flow chart showing a method for effectuating information resource collection by relying on an underlying capability of the system, which includes the following steps.

In the step 201, when an operation system (e.g., operating system) monitors occurrence of a collection event on a display page of any application program, key information of the information resource to be collected is obtained.

In some aspects of the present disclosure, the implementing body is an operation system on the terminal, i.e., the aspects of the present disclosure captures a collection event occurring on a display page of each application program by an operation system, so as to effectuate gathering information resources collected in each application program into a unified favorite. In other words, the operation system is responsible for monitoring a collection event occurring on a page. Among them, the monitored object of the operation system is directed to all the application programs on the terminal, which both include a third party application program from a third party, and include a built-in application program of an operation system. The aspects of the present disclosure make no specific definitions thereto.

Figure 3:
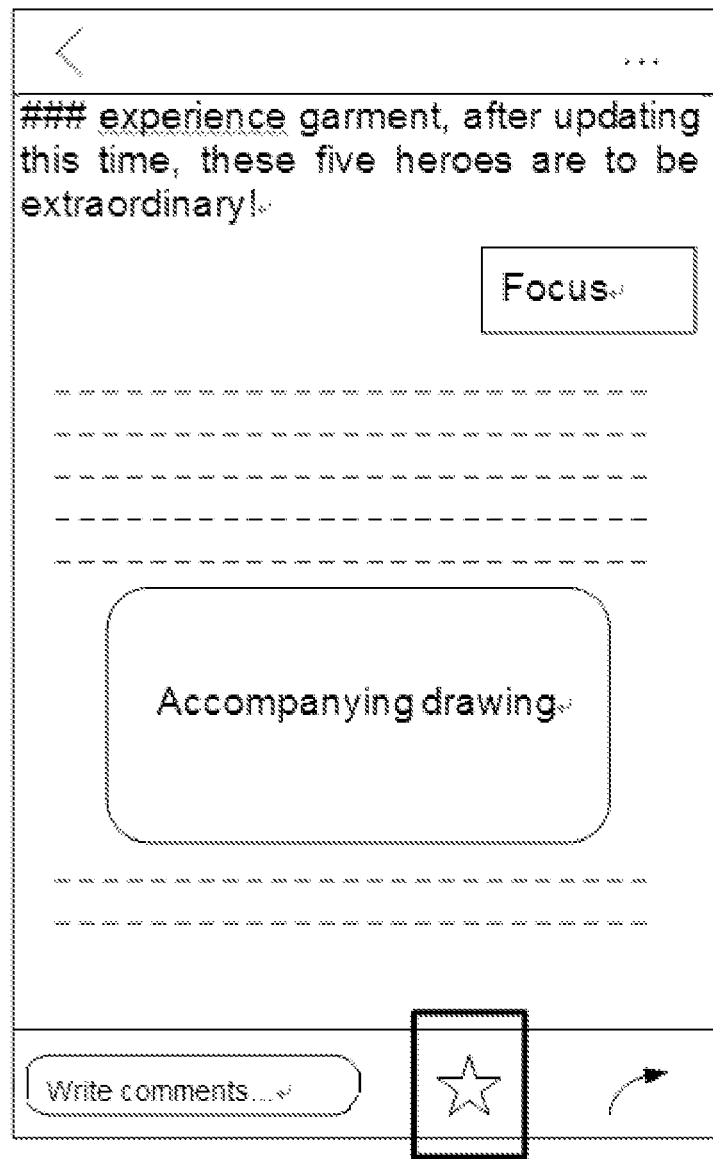
FIG. 3 is a schematic view showing an interface of a terminal according to an exemplary aspect of the present disclosure.

Wherein, a display page of any application display page may be shown in FIG. 3. Take a collection event for a confirmation operation of a collection key displayed on a display page for example, a collection key (a portion within a black block) may be shown at a right lower corner portion in FIG. 3. When a user applies the collection key, the operation system may capture this collection event, so as to take the content included in the display page as information resources to be collected.

It is necessary to explain that, the kinds of the information resources may cover all aspects, such as articles, videos, commodity information, episode information, which may all be included therein. FIG. 3 only explains by exemplification with a collection of articles as an example.

Figure 4:
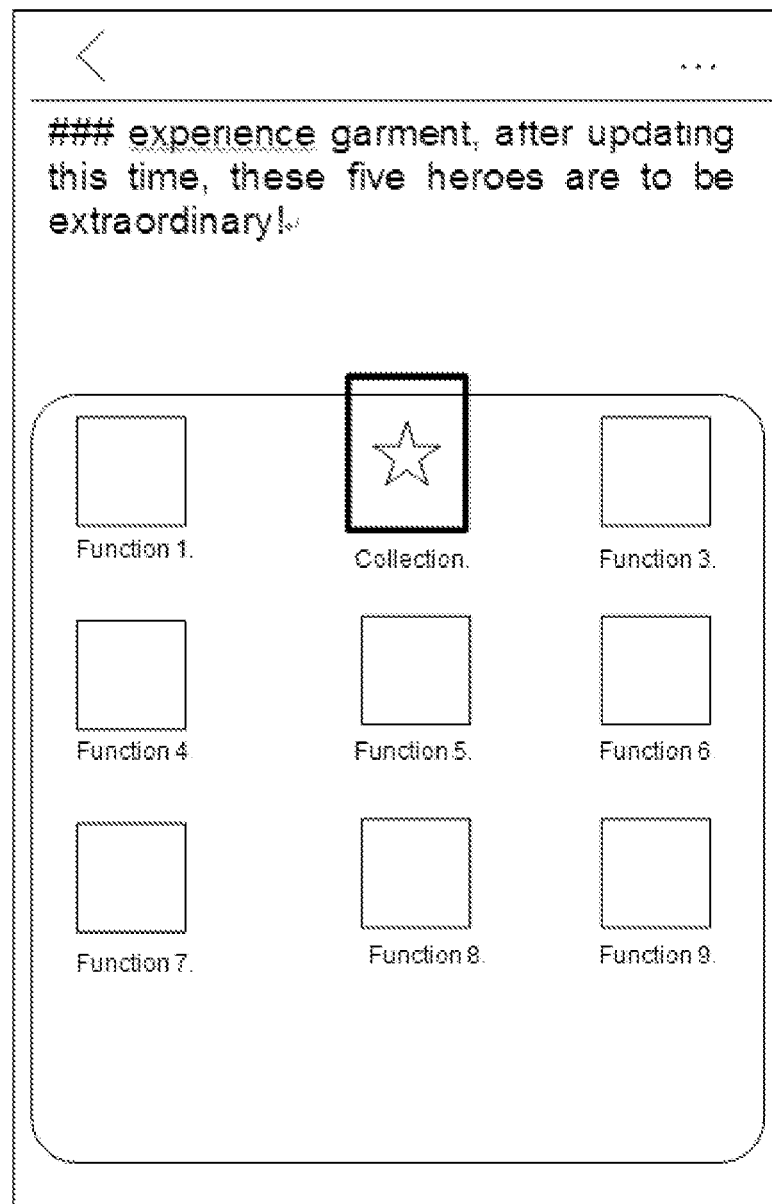
FIG. 4 is a schematic view showing an interface of a terminal according to an exemplary aspect of the present disclosure.

In another aspect, the collection key, in addition to the display manner shown in FIG. 3, may also possibly be present with other display manners shown in FIG. 4. However, regardless of a display manner, the operation system may collect and analyze various kinds of different display pages in advance, so as to further accurately capture a collection event in a page monitoring manner.

In the step 202, the operation system stores key information of the information resource to be collected to a unified favorite.

In some aspects of the present disclosure, the unified favorite gatheringly manages key information of information resources from a plurality of application programs. That is, when an information resource is collected, the operation system stores key information of the information resource to be collected to a unified favorite.

Among them, when the operation system obtains key information of an information resource to be collected, the content included in the key information may also generally vary according to different types of information resources to be collected. That is, for an information resource to be collected, the operation system first determines a type of an information resource to be collected; and afterwards, obtains key information of the information resource to be collected according to a type of the information resource to be collected.

In some aspects of the present disclosure, the information resource to be collected may be generally divided into web page content and non-web page content. Among them, the web content may include a native web page generated by an application program, such as a current headline page from a news application program, and may also include a regenerated web page from other application programs displayed by an application program, for example a gourmet web page from a gourmet application displayed by a social application program.

For non-web page content, it is mainly directed to the following scenarios: when a user chats with a friend via a social application, the user probably is very interested in or focus his or her attention on several content sent by a friend on an information interactive page, and at this time, the user may also possibly trigger a collection event. For this kind of collection event, it may also be captured by the operation system in the aspects of the present disclosure likewise. For example, the user collects an address information sent by a friend.

That is, the operation system when obtaining key information of information resource to be collected according to a type of the information resource to be collected, usually adopts the following two manners:

First manner: if the information resource to be collected is web page content, at least the title information of the information source to be collected as well as the accompanying drawing of the information resource to be collected serve as key information of the information resource to be collected.

For the first manner, in combination with FIG. 3, "### experience garment, after updating this time, these five heroes are to be extraordinary" is the title information, while the accompany drawing on the display page is an accompanying drawing of the information resource to be collected.

In a subsequent process, if it is to display the information resource to be collected on a designated interface, as the information resource to be collected is usually represented by the aforementioned title information and accompanying drawing, the key information at least includes the title information and the accompanying drawing. Certainly, if a current display page itself does not include an accompanying drawing, it is also possible not to obtain an accompanying drawing. Or, if a current display page includes a plurality of accompanying drawings, it is also possible randomly select one in the plurality of accompanying drawings.

In another aspect, in addition to inclusion of the aforementioned content, the key information may also include address link information corresponding to the information resource to be collected, i.e., URL of current display page (Uniform Resource Locator). According to this URL, it is possible to subsequently effectuate pulling specific details of information resource to be collected from the server. Further, the key information may also include collection time, source information and the like. The aspects of the present disclosure make no specific definitions thereto. Among them, the source information is used for representing an application program from which the collection event comes, for example it may be the name of the application program.

Second manner: if the information resource to be collected is non-web page content, at least the content keywords of the information source to be collected serve as key information of the information resource to be collected.

For the second manner, the aforementioned content keywords may be several words having key instructional information extracted in the full text of the information resource to be collected. It may be specifically effectuated by such treatments as word cutting and semantic analysis of the full text of the information resource to be collected. Or, the content keywords may also be several words situated at a prelude of the content of the information resource to be collected. For instance, they may be noun phases contained in the first several sentences in all the content. The aspects of the present disclosure make no specific definitions to the manner of obtaining the content keywords.

In the step 203, the operation system displays a collection completion notification message of the information resource to be collected in such a manner as to be placed on a top layer, and shifts to the designated interface, and displays the unified favorite on a designated area of the designated interface after the operation system detects a user's confirmation operation of the collection completion notification message.

Figure 5:
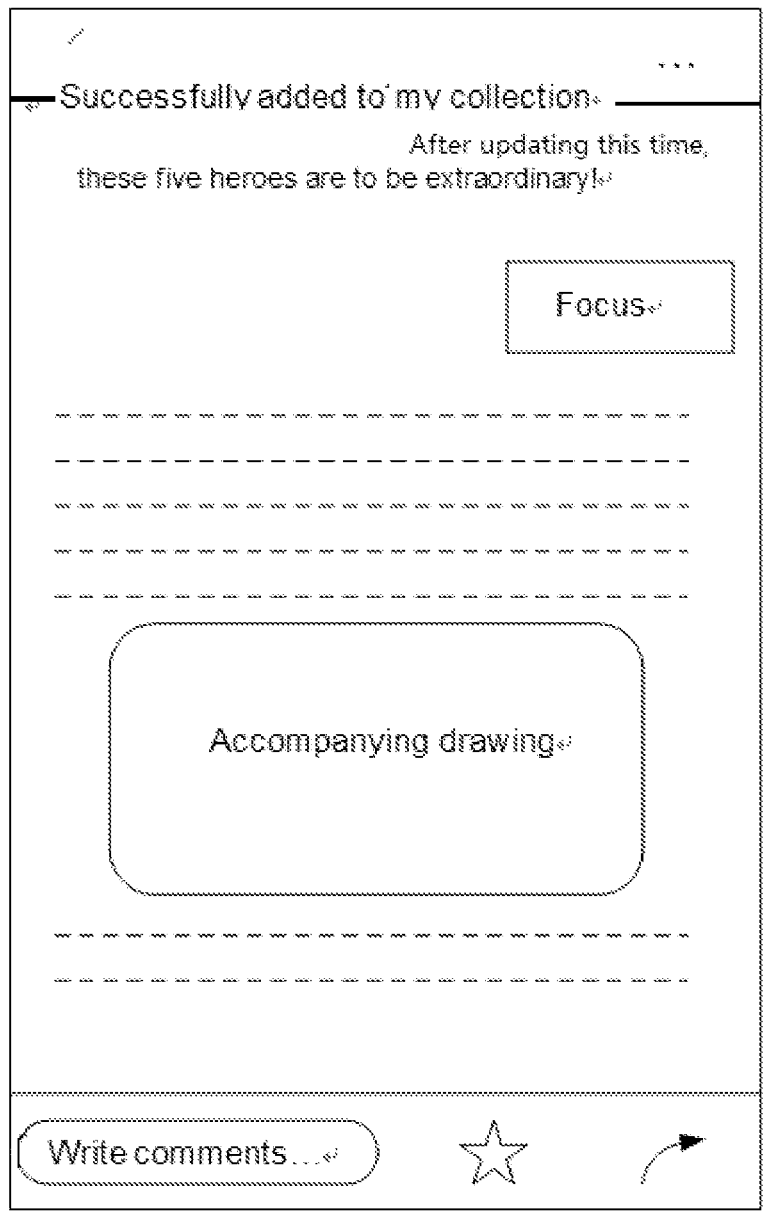
FIG. 5 is a schematic view showing an interface of a terminal according to an exemplary aspect of the present disclosure.

Regarding the step, the operation system after accomplishing collecting the information resource to be collected, may remind a user by notification. With reference to FIG. 5, the collection completion notification message may be such a text format message as "successfully added to my collection." Among them, in order to ensure a user to visually view a collection result of the information resource to be collected, the collection completion notification message is usually displayed on a terminal screen in such a manner as to be placed on a top layer.

Wherein, besides the effect of alerting a user produced therefrom, the collection completion notification message may also serve as an operation access shifting to a designated interface. In other words, after the operation system detects a user's confirmation operation of the collection completion notification message, for example a user clicks on the collection completion notification message, as shown in FIG. 6, the operation system control terminal shifts to the designated interface, and displays the unified favorite on a designated area of the designated interface.

Figure 6:
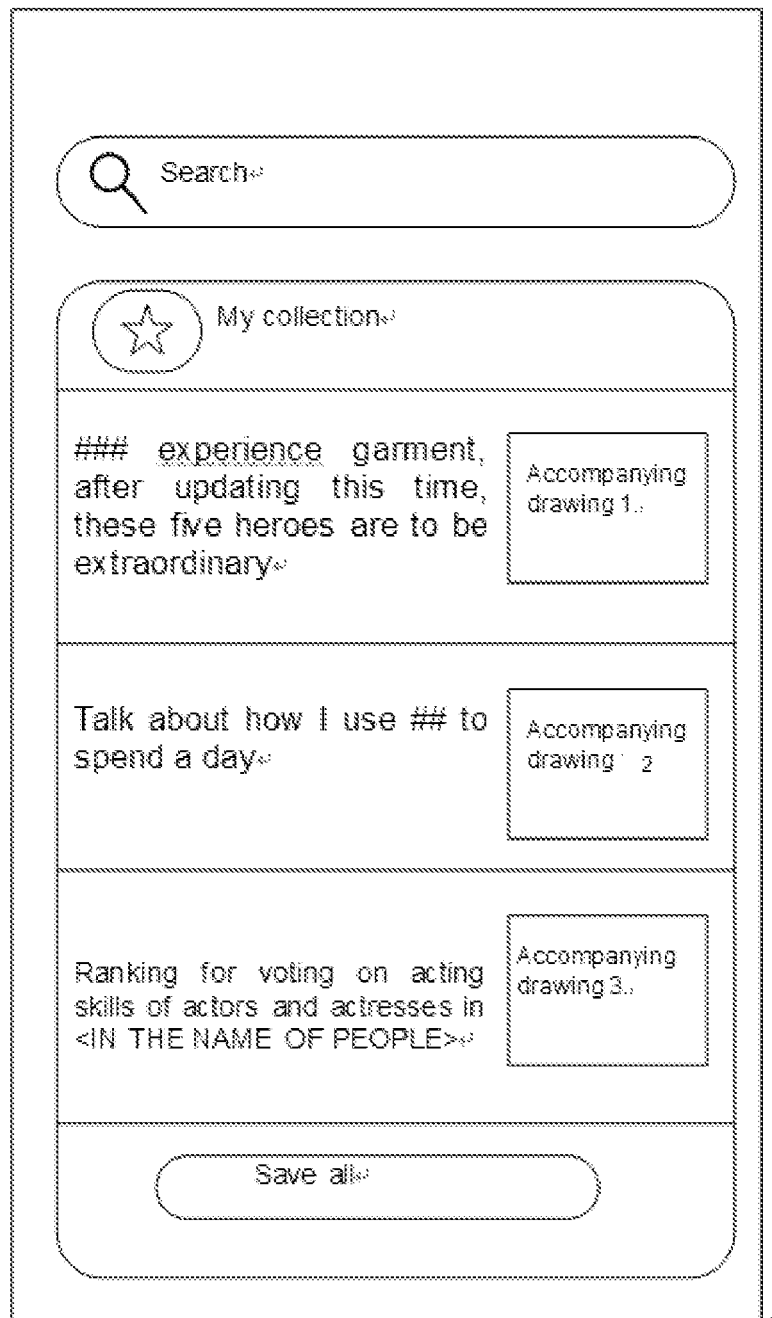
FIG. 6 is a schematic view showing an interface of a terminal according to an exemplary aspect of the present disclosure.

At this time, as shown in FIG. 6, the key information of which collection has just been completed is located at a top position of the designated area. In other words, after a user triggers the collection completion notification message, the terminal will shift to a designated interface, and display the key information of which collection has just been completed on a designated interface, so as facilitate viewing by the user.

In combination with the previous explanations of the designated interface and as can be known from FIG. 6, in the aspects of the present disclosure, the designated interface is divided into a designated area dedicated for displaying a unified favorite. Among them, the unified favorite is displayed on the designated area that has been divided in a form similar to a card.

It is necessary to explain that, for the key information of a plurality of information resources gatheringly collected in the unified favorite, in addition to local saving, the aspects of the present disclosure further supports uploading the same to the first server for backup storage. Among them, the operation system may upload key information of all the information resources gatheringly collected in the unified favorite to the first server by a user logging in a designated account. Further, besides the use of the collection manner, the aspects of the present disclosure further supports manual addition of information resource to be collected in a unified favorite by a user. For instance, a user may also effectuate collecting information resources in such a conventional manner as to share or copy an address link.

For the method for information resource collection provided by the aspects of the present disclosure, as the monitoring system monitors a collection event for a display page of each application program, the operation system may gather and collect information resources initially scattered at each application program, and uniformly save the same in the unified favorite, so as to facilitate a user to utilize the unified favorite to uniformly manage each of the collected information resources, so that it is more intelligent.

To sum up, the above introduces a manner of collecting information resources by an underlying capability of the system. In addition, the aspects of the present disclosure further supports collection of information resources by relying on an interface, so as to replace the aforementioned collection manner by relying an underlying capability of the system. In other words, A second aspect of the present disclosure includes a method for effectuating information resource collection by relying on an interface.

Figure 7:
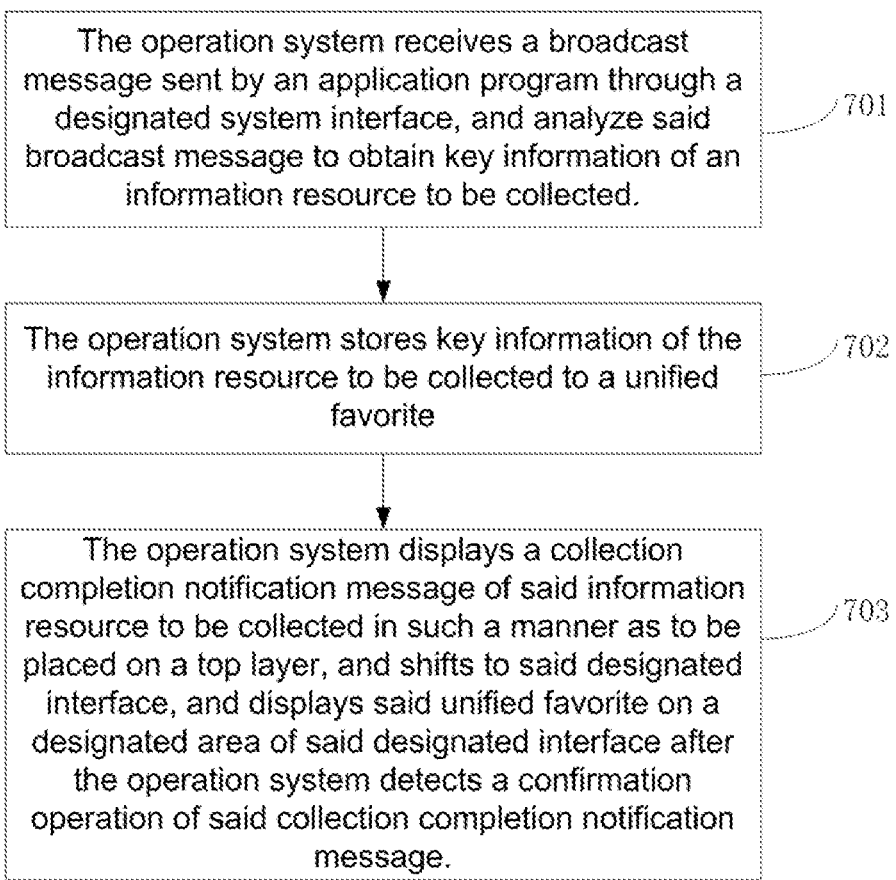
FIG. 7 is a flow chart showing a method for effectuating information resource collection by relying on an interface according to an exemplary aspect of the present disclosure.

With reference to FIG. 7, there is a flow chart showing a method for effectuating information resource collection by relying on an interface, which includes the following steps.

In the step 701, the operation system receives a broadcast message sent by an application program through a designated system interface, and analyze the broadcast message to obtain key information of an information resource to be collected.

First, it is necessary to explain that, the application program mentioned in the present step may be any application program on the terminal, which may be a third party application program from a third party, and may also be a built-in application program of a system. The aspects of the present disclosure make no specific definitions thereto.

In the aspects of the present disclosure, the designated system interface is an open interface directed to the each application program on a terminal for each application program to report its own occurrence of collection events to an operation system. That is, for the collection manner of information resources, there is no need for the operation system to actively monitor a collection event on a display page of an application program. Rather, when a collection event occurs on a display page of the application program, a message broadcast is actively performed by the application program through a designated system interface towards the operation system, so that collection of information resources is accomplished by the operation system based on a received broadcast message.

Among them, please see the aforementioned step 201 for explanations of a collection event, which will no longer be repeated here.

For an application program, if a collection event occurs on a display page provided thereby, the application program may immediately respond to the collection event, and generate a broadcast message of the collection event by an interface standard that is prescribed in advance. Among them, if the information resource to be collected is web page content, the broadcast information may include for example title information, accompanying drawings and address link information of the information resource to be collected. The broadcast message includes content keywords and the like of the information resource to be collected, if the information resource to be collected is non-web page content.

Further, in order to facilitate data transmission between an application program and an operation system, it is also possible to perform for example compression treatment of a broadcast message. The aspects of the present disclosure make no specific definitions thereto. Further, the operation system after receiving the aforementioned broadcast message through a designated system interface, may analyze the broadcast message according to the aforementioned interface standard, so as to analyze key information of the information resource to be collected out of the broadcast message.

In the step 702, the operation system stores key information of the information resource to be collected to a unified favorite.

The step is similar to the aforementioned step 202, and thus will no longer be repeated here.

In the step 703, the operation system displays a collection completion notification message of the information resource to be collected in such a manner as to be placed on a top layer, and shifts to the designated interface, and displays the unified favorite on a designated area of the designated interface after the operation system detects a confirmation operation of the collection completion notification message.

The step is similar to the aforementioned step 203, and thus will no longer be repeated here.

For the method for information resource collection provided by the aspects of the present disclosure, since a system interface is provided for each application program, when a collection event occurs on a page, the matched application program may actively perform message broadcast through the system interface towards the operation system which may further gather and collect information resources initially scattered at each application program on the basis of the broadcast information, and uniformly save the same in the unified favorite, so as to facilitate a user to utilize the unified favorite to uniformly manage each of the collected information resources, so that it is more intelligent.

To sum up, two different methods for information resource collection are introduced. Among them, the information resource collection manner by relying on an underlying capability of the system is suitable for an application program that is not accessed to the aforementioned designated system interface, while the information resource collection manner by relying on an interface is suitable for an application program that is accessed to the aforementioned designated system interface. Further, no matter which manner is taken to gather information resources from various application programs in a unified favorite, the aspects of the present disclosure may display key information of information resources gatheringly collected in a unified favorite in the following manner. In other words, A third aspect of the present disclosure includes a method for displaying information resources.

Figure 8:
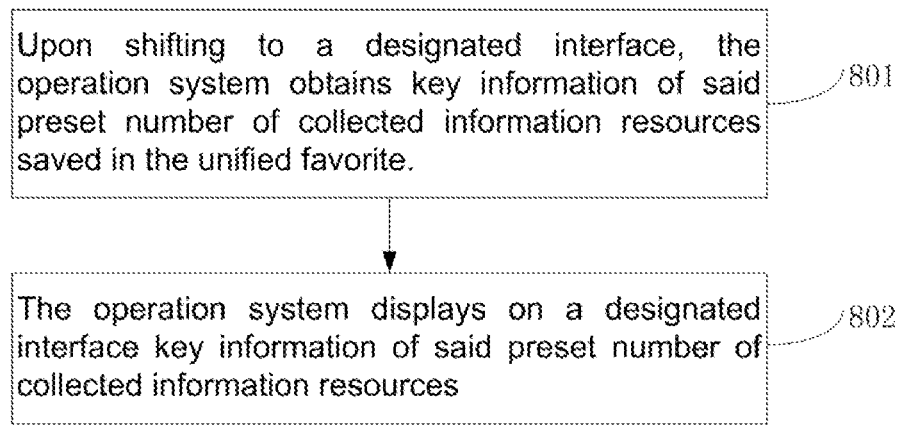
FIG. 8 is a flow chart showing a method for displaying information resources according to an exemplary aspect of the present disclosure.

With reference to FIG. 8, there is a flow chart showing a method for displaying information resources, which includes the following steps.

In the step 801, upon shifting to a designated interface, the operation system obtains key information of the preset number of collected information resources saved in the unified favorite.

In the aspects of the present disclosure, as mentioned above, the unified favorite gatheringly saves key information of information resources from various application programs saved by a user. Accordingly, as it is possible that there are a large number of information resources involved in a unified favorite which has a definite size for a designated area occupied when displayed on a designated interface, it is also necessary to determine among a large number of collected information resources several information sources which are displayed on a designated area.

Among them, when information resources are selected, it may be realized according to collection time. That is, when key information of the preset number of collected information resources saved in the unified favorite is obtained, the following manner may be used: a number of an information resource displayable on the designated area is determined based on a size of a designated area occupied; and a preset number of collected information resources that are latest (i.e., most recent) collected and match with the number of information resources in the unified favorite is selected in an order from near to far (i.e., most recent to least recent; latest to earliest) according to collection time;

In the step 802, the operation system displays on a designated interface key information of the preset number of collected information resources.

Among them, when key information of the preset number of collected information resources that has been selected is displayed, it may also be realized according to collection time. That is, key information of the preset number of collected information resource on the designated area is displayed in a manner of information items in an order from near to far according to collection time. Among them, with reference to FIG. 6, key information of an item of collected information resource occupies an information item. The key information of the latest collected information resources in the preset number of collected information resources is displayed at a top position of the designated area, and the key information of the earliest collected information resource is displayed at a bottom position of the designated area.

For instance, with reference to FIG. 6, the preset number takes a value of 3, i.e., key information of three items of collected information resources are displayed on a designated area. In another aspect, key information of the preset number of collected information resources that has been selected is displayed in an order from near to far according to collection time. Corresponding to FIG. 3, with collection time as a measurement criteria, "### experience garment, after updating this time, these five heroes are to be extraordinary" displayed at a top position of a designated area is later than "talk about how I use ## to spend a day", while "Talk about how I use ## to spend a day" is later than "Ranking for voting on acting skills of actors and actresses in <IN THE NAME OF PEOPLE>".

First, it is necessary to explain that, if collection of an item of information resource is accomplished at this time, key information of this information resource that has just been collected may by displayed at the top of a designated area by replacing "### experience garment, after updating this time, these five heroes are to be extraordinary" in FIG. 6, and compliantly, "Ranking for voting on acting skills of actors and actresses in <IN THE NAME OF PEOPLE>" may disappear at a designated area.

Second, it is necessary to explain that, as each title information contains probably different numbers of characters, when the number of characters contained in title information exceeds certain threshold value, it is possible to only display part of the content of the title information on a corresponding information item.

Third, it is necessary to explain that, for information resources in a non-web page form, they probably exclude accompanying drawings, or for several information resources in a web page form, the resources themselves probably also exclude accompanying drawings. Regarding such two circumstances mentioned, the operation system may perform distribution of default accompanying drawings for corresponding information resources.

In another aspect, besides the preset number of collected information resources that has been selected, other collected information resources in a unified favorite may also be displayed according to the following manner.

Figure 9:
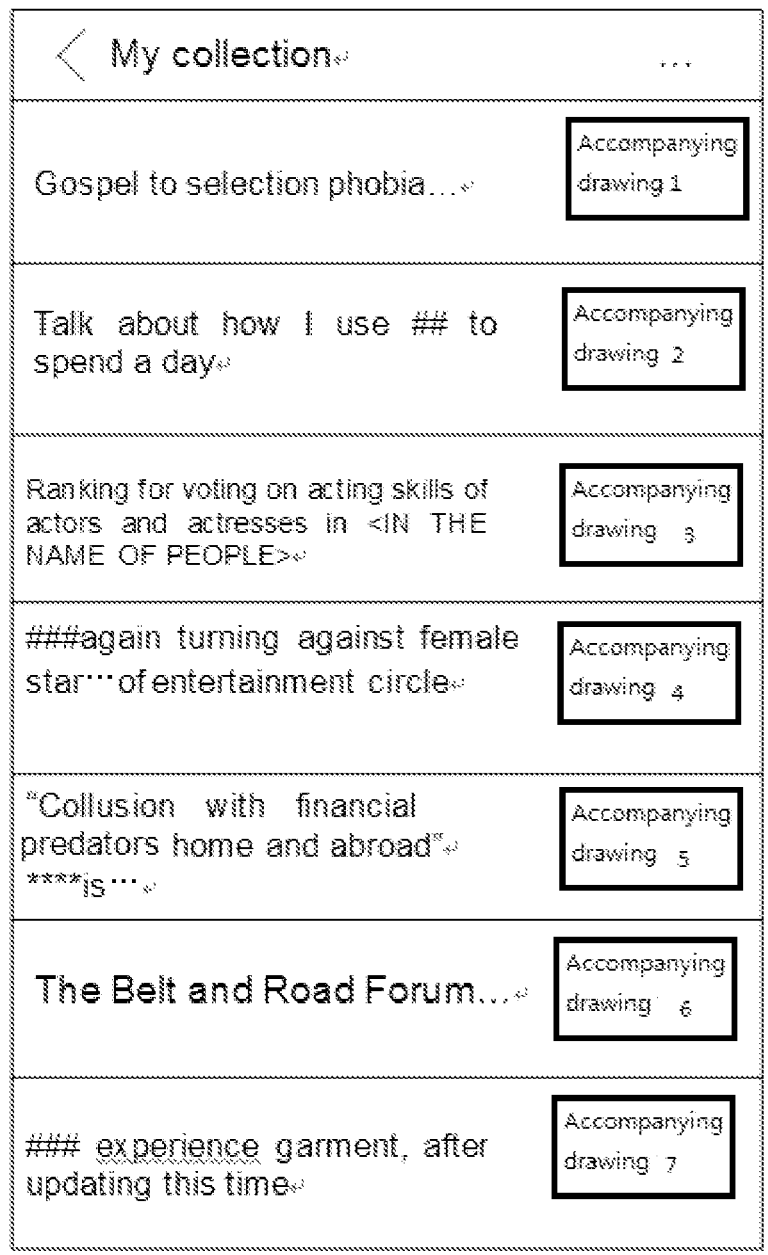
FIG. 9 is a schematic view showing an interface of a terminal according to an exemplary aspect of the present disclosure.

For instance, a detail presentation key is displayed on the designated area displayed on the unified favorite. With reference to FIG. 6, the "Save all" key at a tail position of a designated area is a specific presentation form of a detail display key. The key information of the plurality of collected information resources gatheringly saved in the unified favorite is displayed also in an order from near to far according to collection time after the system detects a user's clicking operation of the detail presentation key. As shown in FIG. 9, the key information of the latest collected information resources in the plurality of collected information resources is also displayed at a top position of a page, and the key information of the earliest collected information resource is displayed at a bottom position of the page.

Further, if there is a large amount of information resources gatheringly saved in a unified favorite, when a new page is opened to display the saved information resources, with a restriction by the size of a terminal screen, it is only possible to display key information of part of the information resources. Regarding the circumstance, the aspects of the present disclosure further support scroll displaying key information of other an information resource than the plurality of collected information resources in the unified favorite in an order from near to far according to collection time when the operation system detects a sliding operation on the new page.

In another aspect, when the operation system detects a user's confirmation operation of the detail presentation key, in addition to directly displaying the gatheringly saved information resources according to a sequence of collection time, the aspects of the present disclosure further supports classified display of the gatheringly saved information resources. The detailed process is as follows:

The key information of the plurality of collected information resources in the unified favorite is displayed according to the kinds of the information resources. Among them, the information resources pertaining to the same kind in multiple information resources are displayed at adjacent positions, and key information of the earlier collected information resources pertaining to the same kind in the information resources is displayed at more frontal positions.

In other words, although various information resources that have been collected are divided in kind, for at least one item of information resource pertaining to the same kind, upon display, it is also necessary to perform sequential display in an order from near to far according to collection time.

Regarding the information resources in a web page form, the kinds of the information resources are divided on the basis of a domain name. That is, address link information corresponding to various collected information resources is obtained; domain name information is extracted in address link information corresponding to collected information resources; at least two collected information resources conforming to domain name information are determined as information resources pertaining to the same type. For instance, for a video application, a domain name in address link information corresponding to information resources of the video application may usually include a name of a video website. For two items of information resources, as long as a title of the video website appears in two corresponding address link information, both of them pertain to the same kind.

Regarding the information resources in a non-web page form, they may be summarized as one kind. Or, the extracted content keywords are identified to divide the kind of the information resources in detail on the basis of an identification result. The aspects of the present disclosure make no specific definitions thereto.

In another aspect, it further supports deletion of collected information resources.

Continue to take the aforementioned multiple collection information resources for example. A deletion key may be respectively displayed on information items in which key information of multiple collected information resources is situated; collected information resources that are selected are deleted in a unified favorite after the operation system detects a confirmation operation of a deletion key matching any collected information resource.

In another aspect, for various information resources that are currently displayed, regardless of display on a designated area or display in a new page by selecting a detail display key, the aspects of the present disclosure further supports a user's viewing specific content of the item of information resources other than key information. Among them, specific content of designated information resources that are selected may be displayed through a network view assembly of the system, and display may also be displayed by a corresponding application program. A specific manner in which display is performed may be set by a user. For instance, a popup window for a user to select an opening manner pops up after detection of a selected operation of a designated information resource. Among them, the network view assembly of the system refers to a webview assembly.

Wherein, when specific content of a designated information resource is obtained, it may be realized by the following manner: a designated information resource is obtained from a second server according to the address link information corresponding to the information resource to be collected, if the information resource to be collected is web page content, after detection of a selected operation of any key information that is currently displayed. Or, if a designated information resource is non-web page content, a designated information resource is locally obtained according to the content keywords contained in selected key information.

For a manner of using an application program to display, the specific content concerning a designated information resource is substantively obtained by this application program, for example loading of relevant pages is performed by the application program from a second server. In other words, an application program from which the designated information resource comes is determined according to an address link information corresponding to the designated information resource, if the designated information resource selected is content of a page, after detection of a selected operation of any key information that is currently displayed; and further the determined application program is opened and the designated information resource is displayed through the determined application program.

Here, the process from opening the determined application program to displaying the designated information resource through the determined application program, contains a step of obtaining specific content from the second server by the determined application program.

Among them, when an application program from which a designated information resource comes is determined according to an address link information corresponding to a designated information resource, it is usually realized by using the following manner: an application program from which the designated information resource comes is determined according to a domain name in the address link information corresponding to the designated information resource. In other words, the aspects of the present disclosure locally save a list of correspondence relations between a domain name and an application program in advance. According to a domain name in the aforementioned address link information, a matched search is performed in a list of correspondence relations between a domain name and an application program, so as to determine an application program from which a designated information resource comes.

It is necessary to explain that, this list of correspondence relations between a domain name and an application program may be updated. That is, the operation system in the aspects of the present disclosure may receive an updated instruction of a first server for the list, and accomplish updating the list according to the updated instruction. In other words, the aforementioned list is artificially maintained such that, the first server may periodically send an updating instruction to a terminal, or in the event of an update send an updating instruction to a terminal in real time, so that the terminal readily updates this list according to the updating instruction.

In another aspect, if the aforementioned designated information resource or any information resource for which the specific content is to be displayed is graph-text content, for example an article information web page, take a designated information resource for example, before displaying the designated information resource, the designated information resource may also be re-typeset processed to obtain a processed information resource, such as to display the processed information resource.

Among them, the object of re-typeset processing lies in that: on one hand, it may allow multiple information resources having various web page display forms to present a uniform display fashion, and on the other hand, it may also filter off for example advertising information in an original web page that is not related with the specific content itself In another aspect, if the aforementioned processed information resource is displayed by a network view assembly, a display experience setting option may be displayed on a page for displaying the designated information resource after being processed. Among them, the display experience setting option at least includes a background color adjustment option and a font size adjustment option. Further, the background color adjustment option includes two pulldown sub-options of background color, and the font size adjustment option includes at least two pulldown sub-options of font size, so as to effectuate adjusting a background color and a font size.

In another aspect, for several information resources which are possibly present with dynamic updating, with regard to each item of information resource gatheringly collected in a unified favorite, the operation system may periodically detect whether each item of collected information resource is present with dynamic updating. If an item of information resource is present with dynamic updating, key information of the item of information resource as well as an updating notification message of the item of information resource are displayed at a top position of a designated area in which a unified favorite is situated, so as to achieve the purpose of alerting a user in real time. Among them, the types of information resources present with dynamic updating include but are not limited to the following several:

Commodity price trend and discount reminding: with regard to collected information resources concerning introduction information of commodity, a price variation condition of the price may be tracked for a long time, and at the same time, it may be set such that a user is reminded in a manner such as notification after discount or certain amplitude of discount.

Video episode updated reminding: with regard to collected information resources that are videos, an episode updated condition may be obtained by a video server to provide an episode following capability, so that a user is reminded in a manner such as notification when a new episode is updated.

eBook updated reminding: with regard to collected information resources that are eBooks, a book updated condition may be obtained by an eBook server to provide a book following capability, so that a user is reminded in a manner such as notification when a new chapter is updated.

Person-related content updating: with regard to collected information resources that concern introduction of a person/group and encyclopedia content, a user may be recommended with updating of current personal status as well as relevant news of a collected person.

New dynamic reminding of commodity: with regard to information resources that concern commodity introduction information, when a commodity has a new dynamic, for example there are new promotion activities (new group purchase, discount, etc.) or store state changes or there are relevant news, a user is reminded likewise in a manner such as notification.

It is necessary to explain that, for each application program for the time being, it possesses a message push function, so as to remind a user in real time when there is a relevant dynamic update. Accordingly, the operation system may capture dynamic updates of the aforementioned various types of information resources by obtaining push messages of various application programs. Certainly, other manners may also be used to effectuate obtaining dynamic updates. The aspects of the present disclosure make no specific definitions thereto.

Regarding the method for displaying information resources provided by the aspects of the present disclosure, as it is effectuated that various items of information resources gatheringly saved in a unified favorite are displayed on a designated interface in the form of a card, certain item of information resource may be conveniently and rapidly viewed without requiring a user to perform multi-step complicated operations, so as to provide a fast and efficient operation access for a subsequent viewing process, and make it more intelligent.

As key information of information resources from a plurality of application programs are gatheringly saved in a unified favorite, while a user may be present with a viewing requirement of certain item of information resource in these information resources, in order to facilitate rapidly searching for a target information resource in a large amount of information resources saved in a unified favorite by a user, the aspects of the present disclosure further provide a method for searching for information resources. In other words, A fourth aspect of the present disclosure includes a method for searching for information resources.

Figure 10:
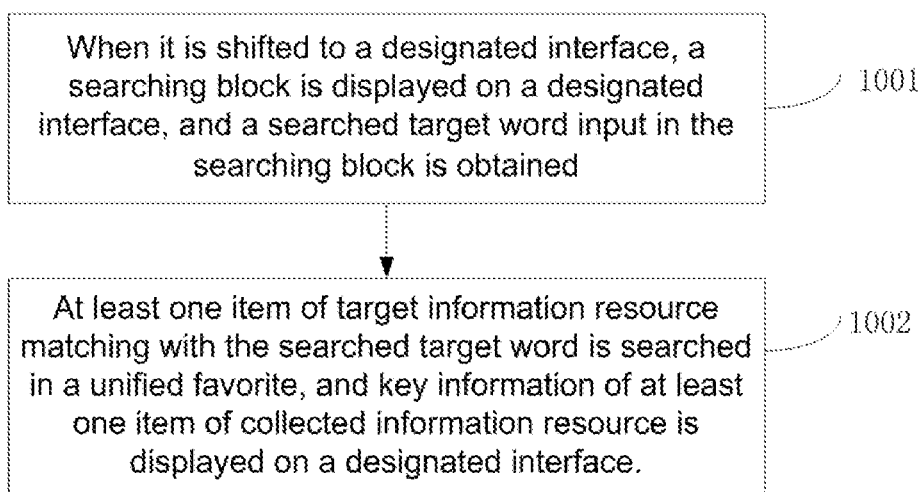
FIG. 10 is a flow chart showing a method for searching for information resources according to an exemplary aspect of the present disclosure.

With reference to FIG. 10, there is a flow chart showing a method for searching for information resources, which includes the following steps.

In the step 1001, when it is shifted to a designated interface, a searching block is displayed on a designated interface, and a searched target word input in the searching block is obtained.

Figure 11:
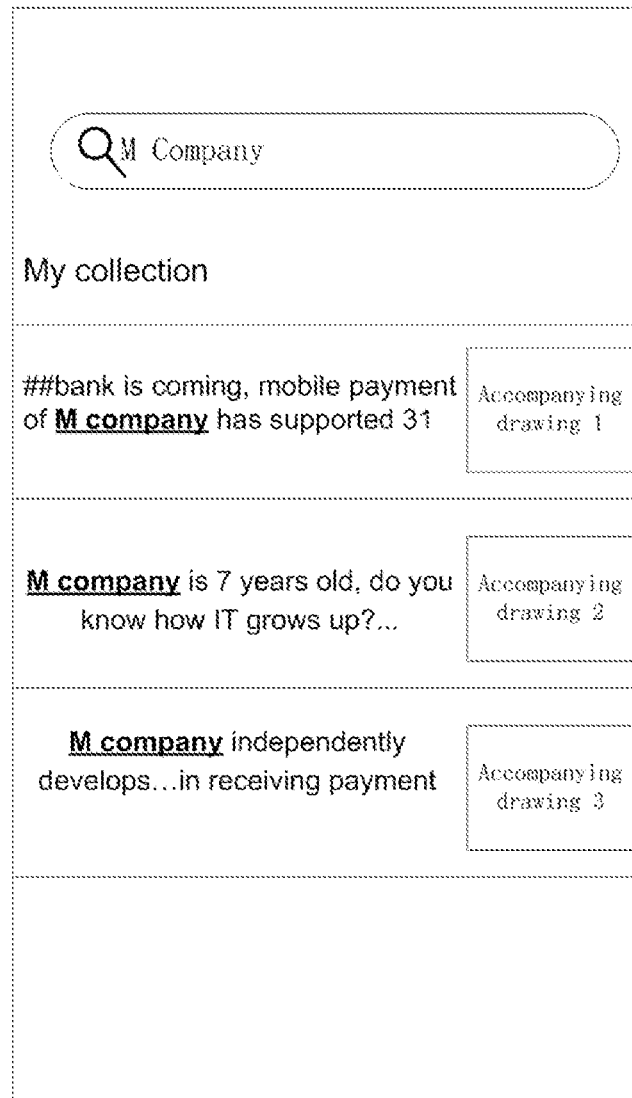
FIG. 11 is a block diagram showing an information resource collection device according to an exemplary aspect of the present disclosure.

Regarding the step, when it is shifted from any interface to a designated interface, as shown in FIG. 11, a searching block is displayed on a designated interface. Under normal circumstance, the operation system after detecting a user's selected operation of the searching block, may display a cursor in the searching block, and at the same time call out an input interface, for a user to input. Afterwards, the operation system obtains content input into the searching block by a user, and takes the input content as a searched target word.

In the step 1002, at least one item of target information resource matching with the searched target word is searched in a unified favorite, and key information of at least one item of collected information resource is displayed on a designated interface.

As mentioned above, the information resource is divided into web page content and non-web page content. When a target information resource is searched in the aspects of the present disclosure, for information resources in a web page form, a search is made in title information included by the key information, and for information resources in a non-web page form, a search is made in content keywords included by the key information. In other words, when at least one target information resource matching with the searched target word is searched, it may be effectuated by using the following manner:

At least one item of title information is obtained in all the key information stored in a unified favorite; for each item of title information in at least one item of title information, if an item of title information includes a searched target word, the collected information resource corresponding to the title information is determined as a target information resource. Or, At least one item of content keyword is obtained in all the key information stored in a unified favorite; for each item of title information in at least one item of content keyword, if an item of content keyword includes a searched target word, the collected information resource corresponding to the content keyword is determined as a target information resource.

In another aspect, for information resources in a non-web page form, as it directly saved to local, a search for a searched target word may also be made within a full text range of information resources locally stored according to a searched target word.

In the aspects of the present disclosure, after at least one item of target information resource matching with the searched target word is searched, key information of at least one item of target information resource is displayed on a designated interface according to a manner shown in the above text, and thus is no longer repeated here. Further, after detection of a user's selected operation of any item of target information resource, it can also be known that as mentioned above, the selected target information resource is displayed by a webview assembly or a determined application program. Among them, the selected target information resource comes from a determined application program.

In another aspect, after at least one item of target information resource is searched, at least one item of target information resource may also be displayed on a designated area. Among them, if the amount of at least one item of target information resource is less than a maximum number of items of information resources that are displayable, all the target information resources may be displayed on a designated area at the same time. If the amount of at least one item of target information resource is more than a maximum number of items of information resources that are simultaneously displayable, in at least one item of target information resource, a preset number of items of information resources that are latest collected and match with a maximum number of items of information resources are selected; afterwards, key information of a preset number of items of information resources is displayed on a designated area.

In another aspect, for any item of target information resource displayed on a designated area, if key information of the target information resource includes content keywords, as shown in FIG. 11, a searched target word appearing in the content keywords is displayed, usually in a display manner distinguishable from other words in the content keywords. Or, if key information of the target information resource includes title information, a searched target word appearing in the title information is displayed, in a display manner distinguishable from other words in the title information.

In other words, for an item of information resource, with regard to key information in a text form displayed on an interface shown in FIG. 11, if key information in a text form includes a searched target word, the corresponding content will be displayed such as to be distinguishable from other content.

In another aspect, the searching range of the searching block, which may be further enlarged, is not only limited to a unified favorite, but may also be directed to all the other content saved on the terminal other than a unified favorite, and also display other content associated with the searched target word. Moreover, regarding the determination of a searching range, it may be effectuated by a user by means of providing a corresponding searching mechanism. Further, for this searching function of information resources, the operation system may also provide a function enabling key, by means of which a user may manually choose to enable or disenable the searching function. The aspects of the present disclosure make no specific definitions thereto.

The method for searching for information resources provided by the aspects of the present disclosure, on the basis of a search target word input by a user, may automatically search for a target information resource in a plurality of information resources gatheringly collected in a unified favorite, and avoid the defect that a user when forgetting an application in a favorite of which a target information resource is situated is also required to make a thorough search in the prior art, so that the process of searching for information resources is more simple and more intelligent.

Figure 12:
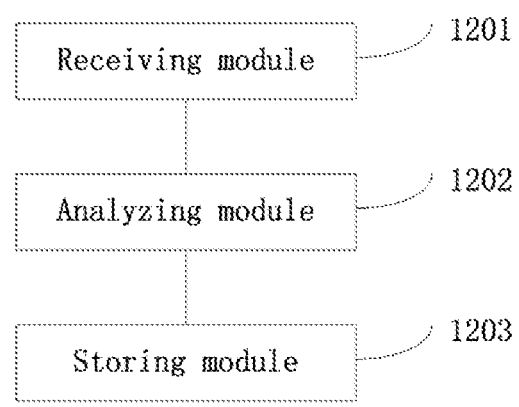
FIG. 12 is a block diagram showing an information resource collection device according to an exemplary aspect of the present disclosure.

FIG. 12 is a block diagram showing an information resource collection device according to an exemplary aspect. With reference to FIG. 2, the device includes a receiving module 1201, an analyzing module 1202 and a storing module 1203.

The receiving module 1201, is configured to receive a broadcast message sent by an application program through a designated system interface which is an open interface directed to the each application program for each application program to report its own occurrence of collection events to an operation system.

The analyzing module 1202, is configured to analyze the broadcast message to obtain key information of an information resource to be collected.

The storing module 1203, is configured to store the key information of an information resource to a unified favorite, which is used for gatheringly displaying on a designated interface key information of an information resource from at least one application program that has been collected.

Figure 13:
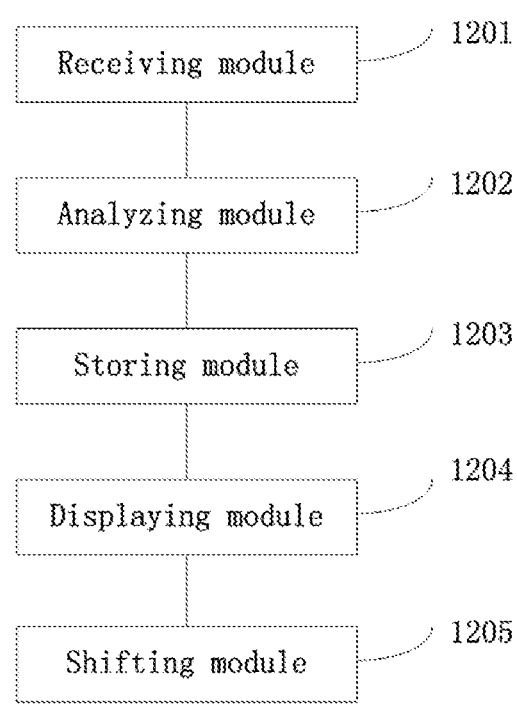
FIG. 13 is a block diagram showing an information resource collection device according to an exemplary aspect of the present disclosure.

In another aspect, with reference to FIG. 13, the device further includes:

a display module 1204 configured to display a collection completion notification message of the information resource to be collected in such a manner as to be placed on a top layer;

a shifting module 1205 configured to shift to the designated interface after detection of a click operation of the collection completion notification message;

the display module 1204, further configured to display the unified favorite on a designated area of the designated interface;

wherein the key information of the information resource to be collected is located at a top position of the designated area.

In another aspect, the display module 1204, is configured to display a detail presentation key on the designated area displayed on the unified favorite.

The display module 1204, is further configured to display the key information of the plurality of collected information resources stored in the unified favorite in an order from near to far according to collection time after detection of a click operation of the detail presentation key.

Wherein, the key information of the latest collected information resources in the plurality of collected information resources is displayed at a top position of a page, and the key information of the earliest collected information resource is displayed at a bottom position of the page.

In another aspect, the display module 1204 is further configured to scroll display key information of other information resources than the plurality of collected information resources in the unified favorite in an order from near to far according to collection time upon detection of a sliding operation.

Figure 14:
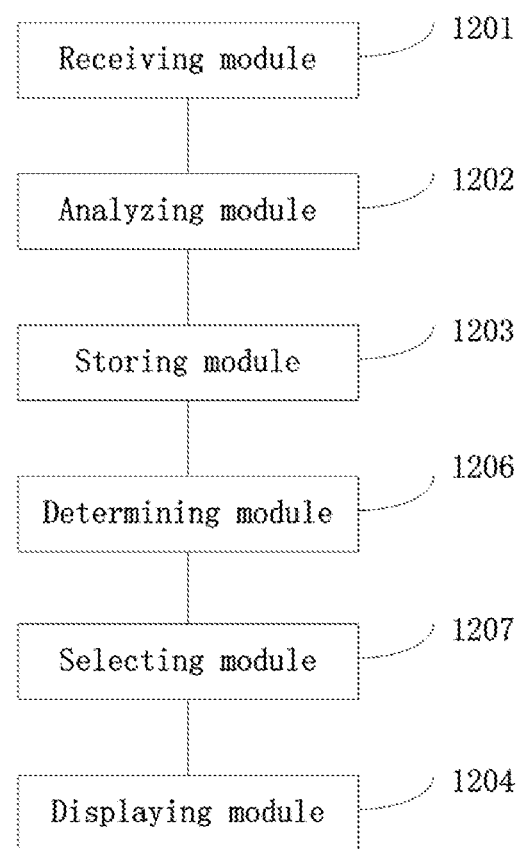
FIG. 14 is a block diagram showing an information resource collection device according to an exemplary aspect of the present disclosure.

In another aspect, with reference to FIG. 14, the device further includes:

a determining module 1206, configured to determine a number of an information resource displayable on the designated area based on a size of a designated area occupied when the unified favorite is displayed;

a selecting module 1207, configured to select a preset number of collected information resources that are latest collected and match with the number of information resources in the unified favorite;

a displaying module 1204, configured to display key information of the preset number of collected information resource on the designated area in an order from near to far according to collection time;

wherein the key information of the latest collected information resources in the preset number of collected information resources is displayed at a top position of the designated area, and the key information of the earliest collected information resource is displayed at a bottom position of the designated area.

In another aspect, the determining module 1206, is further configured to determine which application program the designated an information resource come according to an address link information corresponding to the designated an information resource, if the designated an information resource selected are contents of a page, after detection of a selected operation of any key information in a preset number of key information;

The display module 1204, is further configured to open the determined application program and display the designated information resource through the determined application program.

In another aspect, the determining module 1206, is configured to determine which application program the designated information resource come according to a domain name in the address link information corresponding to the designated information resource.

Wherein, a list of correspondence relations between a domain name and an application program are locally saved in advance.

Figure 15:
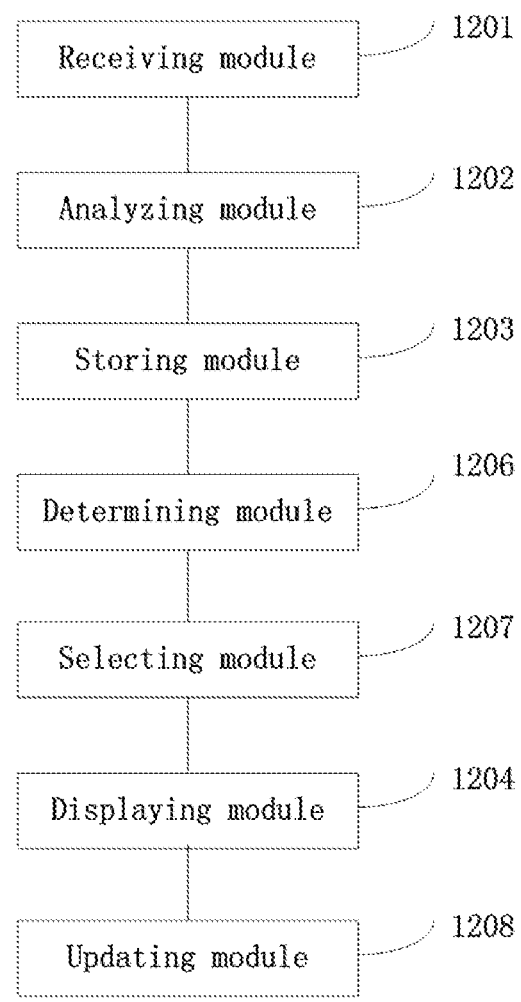
FIG. 15 is a block diagram showing an information resource collection device according to an exemplary aspect of the present disclosure.

In another aspect, with reference to FIG. 15, the device further includes:

a receiving module 1201, configured to receive an updating instruction for the list from the first server;

an updating module 1208, configured to accomplish updating the list according to the updated instruction.

In another aspect, the types of the information resource to be collected at least include web page content and non-web page content.

The key information at least includes title information of the information resource to be collected as well as an accompanying drawing of the information resource to be collected, if the information resource to be collected is web page content.

The key information at least includes content keywords of the information resource to be collected, if the information resource to be collected is non-web page content.

Figure 16:
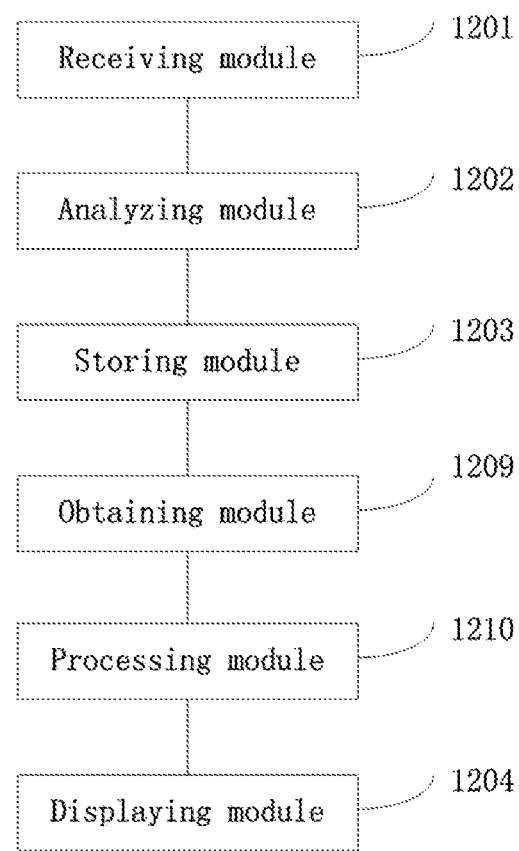
FIG. 16 is a block diagram showing an information resource collection device according to an exemplary aspect of the present disclosure.

In another aspect, with reference to FIG. 16, the device further includes:

an acquiring module 1209, configured to acquire the information resource to be collected from a second server according to the address link information corresponding to the information resource to be collected, if the information resource to be collected is web page content, after detection of a selected operation of the information resource to be collected;

a processing module 1210, configured to re-typeset process the information resource to be collected, to obtain information resource to be collected after processing, if the information resource to be collected is graph-text content;

a display module 1204, configured to display the information resource to be collected after processing through a network view assembly of the system.

In another aspect, the display module 1204, is configured to display the information resource to be collected after processing through a network view assembly of the system.

Figure 17:
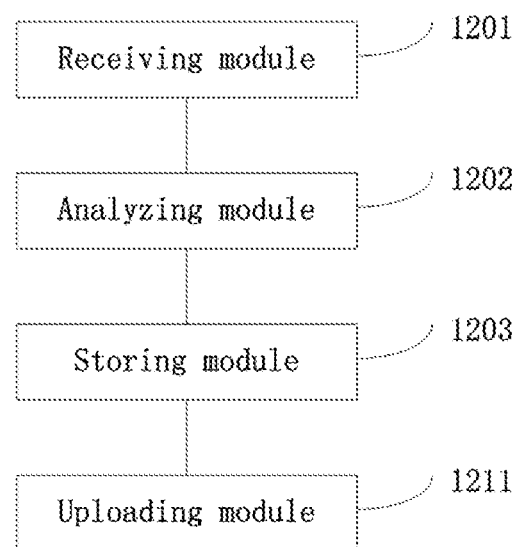
FIG. 17 is a block diagram showing an information resource collection device according to an exemplary aspect of the present disclosure.

In another aspect, with reference to FIG. 17, the device further includes:

an uploading module 1211, configured to upload key information of all the collected information resources in the unified favorite to the first server by logging in a designated account, and save the key information of all the collected information resources by the first server.

For the device provided by the aspects of the present disclosure, since a system interface is provided for each application program, when a collection event occurs on a page, the matched application program may actively perform message broadcast through the system interface towards the operation system which may further gather and collect information resources initially scattered at each application program on the basis of the broadcast information, and uniformly save the same in the unified favorite, so as to facilitate a user to utilize the unified favorite to uniformly manage each of the collected information resources, so that it is more intelligent.

Regarding the device in the aforementioned aspect, the specific manner of performing an operation by each module therein has been described in detail in the aspects concerning the method, and thus will no longer be formulated and explained in detail here.

Figure 18:
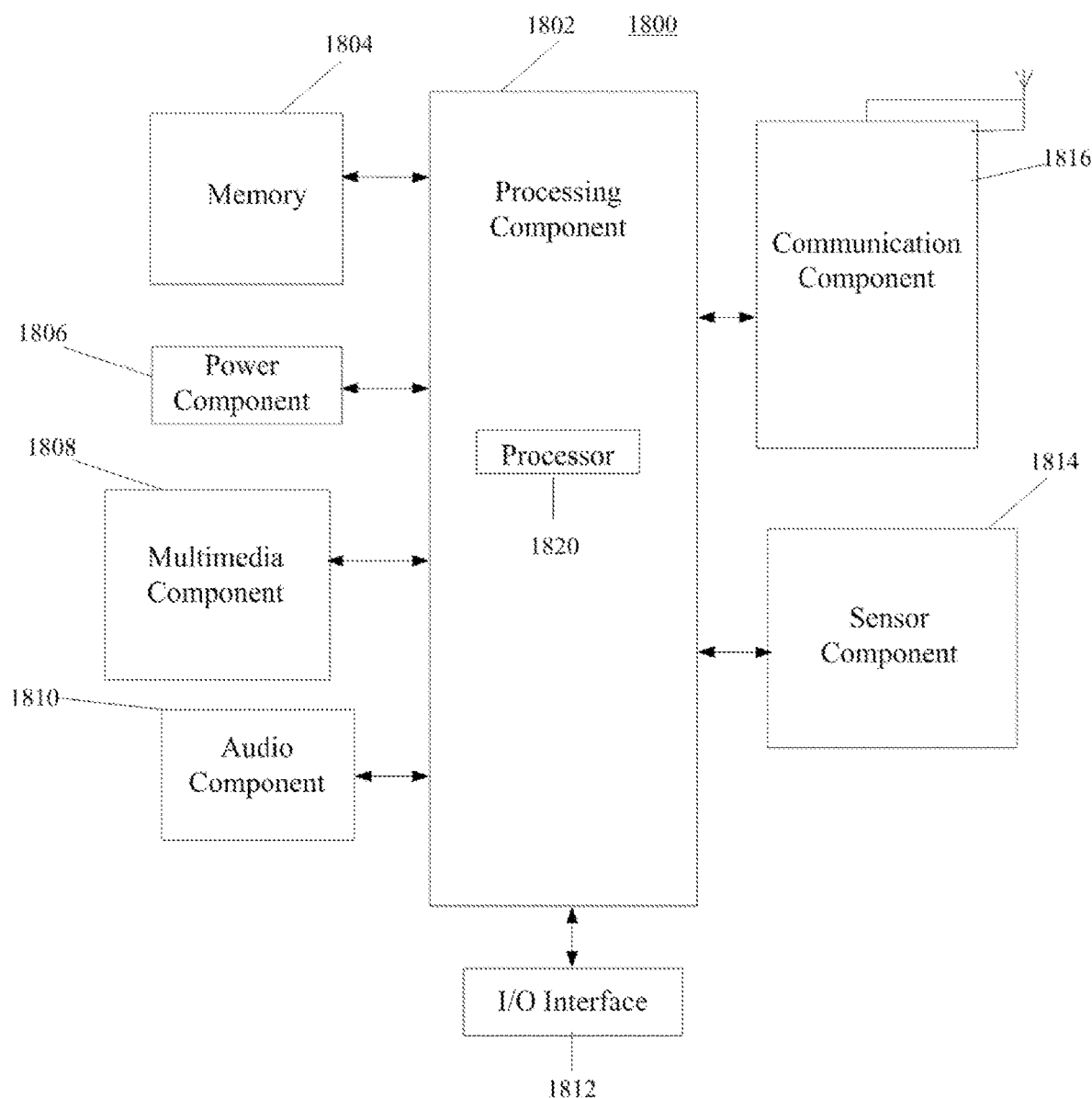
FIG. 18 is a block diagram showing an information resource collection device according to an exemplary aspect of the present disclosure.

FIG. 18 is a block diagram of an information resource collection device 1800 according to an exemplary aspect, the device 1800 may be a mobile phone, a computer, a digital broadcast terminal, a messaging device, a gaming console, a tablet, a medical device, exercise equipment, a personal digital assistant, and the like.

Referring to FIG. 18, the device 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the device 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, video, etc. The memory 1804 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the device 1800. The power component 1806 may include a power management system, one or more power sources, and any other components associated with the generation, management, and distribution of power in the device 1800.

The multimedia component 1808 includes a screen providing an output interface between the device 1800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1808 includes a front camera and/or a rear camera. The front camera and the rear camera may receive an external multimedia datum while the device 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone ("MIC") configured to receive an external audio signal when the device 1800 is in an operation mode, such as a call mode, a recording mode, and a voice recognition mode. The received audio signal may be further stored in the memory 1804 or transmitted via the communication component 1816. In some aspects, the audio component 1810 further includes a speaker to output audio signals.

The I/O interface 1812 provides an interface between the processing component 1802 and peripheral interface modules, such as a keyboard, a click wheel, buttons, and the like. The buttons may include, but are not limited to, a home button, a volume button, a starting button, and a locking button.

The sensor component 1814 includes one or more sensors to provide status assessments of various aspects of the device 1800. For instance, the sensor component 1814 may detect an open/closed status of the device 1800, relative positioning of components, e.g., the display and the keypad, of the device 1800, a change in position of the device 1800 or a component of the device 1800, a presence or absence of user contact with the device 1800, an orientation or an acceleration/deceleration of the device 1800, and a change in temperature of the device 1800. The sensor component 1814 may include a proximity sensor configured to detect the presence of nearby objects without any physical contact. The sensor component 1814 may also include a light sensor, such as a CMOS or CCD image sensor, for use in imaging applications. In some aspects, the sensor component 1814 may also include an accelerometer sensor, a gyroscope sensor, a magnetic sensor, a pressure sensor, or a temperature sensor.

The communication component 1816 is configured to facilitate communication, wired or wirelessly, between the device 1800 and other devices. The device 1800 can access a wireless network based on a communication standard, such as WiFi, 2G, or 3G, or a combination thereof. In one exemplary aspect, the communication component 1816 receives a broadcast signal or broadcast associated information from an external broadcast management system via a broadcast channel. In one exemplary aspect, the communication component 1816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer readable storage medium including instructions, such as included in the memory 1804, executable by the processor 1820 in the device 1800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by the processor of the mobile device, enables the mobile device to perform the method for information resource collection provided by the above-mentioned aspects.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information resource collection method, comprising:

receiving, by an operating system, a broadcast message sent by an application program of a plurality of application programs through a system interface that is configured to direct each of the plurality of application programs to report an occurrence of collection events to the operating system;

analyzing, by the operating system, the broadcast message to obtain key information of an information resource;

obtaining, by the operating system, the key information of the information resource;

storing, by the operating system, the key information of the information resource in a unified favorite folder that is configured to store and display key information of a plurality of collected information resources that has been collected via the system interface from at least one of the plurality of application programs;

periodically detecting, by the operating system, whether each item of the collected information resources in the unified favorite folder is present with dynamic updating; and based on the periodical detection, displaying, by the operating system, key information of the at least one item and an updating notification message of the at least one item at a top position of a designated area in which the unified favorite folder is situated.

2. The method according to claim 1, further comprising:

displaying, by the operating system, a collection completion notification message of the information resource on a top layer;

detecting, by the operating system, a click operation on the collection completion notification message;

switching, by the operating system, to the system interface; and displaying, by the operating system, the unified favorite folder on a designated area of the system interface after detecting the click operation on the collection completion notification message, wherein the key information is located at a top position of the designated area.

3. The method according to claim 1, further comprising:

displaying, by the operating system, a detail presentation key on the designated area of the unified favorite folder;

detecting, by the operating system, a click operation on the detail presentation key; and displaying, by the operating system, the key information of the plurality of collected information resources stored in the unified favorite folder in an order from most recent to least recent according to collection time after detecting the click operation on the detail presentation key, wherein key information of most recent collected information resources of the plurality of collected information resources is displayed at a top position of a page, and key information of less recent collected information resources of the plurality of collected information resources is displayed at a bottom position of the page.

4. The method according to claim 3, further comprising:

detecting, by the operating system, a sliding operation on the page; and displaying, by the operating system, in a scrolling manner, key information of information resources that are different from the plurality of collected information resources in the unified favorite folder upon detection of the sliding operation.

5. The method according to claim 1, further comprising:

determining, by the operating system, a number of the plurality of collected information resources displayable on the designated area based on a size of an area that is occupied by the unified favorite folder when the unified favorite folder is displayed;

selecting, by the operating system, a preset number of the plurality of collected information resources that are most recently collected and match the number of the plurality of collected information resources displayable on the designated area; and displaying, by the operating system, key information of the preset number of the plurality of collected information resources on the designated area in an order from most recent to least recent according to collection time, wherein key information of most recent collected information resources of the preset number of the plurality of collected information resources is displayed at a top position of the designated area, and key information of less recent collected information resources of the plurality of collected information resources is displayed at a bottom position of the designated area.

6. The method according to claim 5, further comprising:

detecting, by the operating system, a select operation that is configured to select one of the preset number of the plurality of collected information resources;

determining, by the operating system, whether the selected information resource is a content of a page;

after detecting the select operation and determining that the selected information resource is the content of the page, determining an application program from which the selected information resource originates based on address link information corresponding to the selected information resource; and opening, by the operating system, the determined application program and displaying the selected information resource through the determined application program.

7. The method according to claim 6, wherein determining the application program from which the selected information resource originates includes:

determining, by the operating system, the application program from which the selected information resource originates based on a domain name in the address link information corresponding to the selected information resource, wherein a list of correspondence relations between domain names and application programs is locally saved before determining the application program from which the selected information resource originates.

8. The method according to claim 1, wherein types of information resources including the plurality of collected information resources include at least one of web page content and non-web page content, when the information resource is the web page content, the key information includes title information of the information resource and an accompanying drawing of the information resource, and when the information resource is the non-web page content, the key information includes content keywords of the information resource.

9. The method according to claim 8, further comprising:

detecting, by the operating system, a select operation of the information resource;

after detecting the select operation of the information resource, if the information resource is web page content, acquiring, by the operating system, the information resource from a second server based on address link information corresponding to the information resource;

re-typeset processing, by the operating system, the information resource to obtain the information resource if the information resource is graph-text content;

obtaining, by the operating system, the information resource; and displaying, by the operating system, the information resource through a network view assembly.

10. An information resource collection device, comprising:

circuitry configured to:

receive, by an operating system, a broadcast message sent by an application program of a plurality of application programs through a system interface that is configured to direct each of the plurality of application programs to report an occurrence of collection events to the operating system;

analyze, by the operating system, the broadcast message to obtain key information of an information resource;

obtain, by the operating system, the key information of the information resource;

store, by the operating system, the key information of the information resource in a unified favorite folder that is configured to store and display key information of a plurality of collected information resources that has been collected via the system interface from at least one of the plurality of application programs;

for information resources that are present with dynamic updating, with regard to each item of the information resources collected in the unified favorite folder, periodically detect, by the operating system, whether each item of the collected information resources is present with the dynamic updating; and when at least one item of the collected information resources is present with the dynamic updating, display, by the operating system, key information of the at least one item and an updating notification message of the at least one item at a top position of a designated area in which the unified favorite folder is situated.

11. The device according to claim 10, wherein the circuitry is further configured to:

display, by the operating system, a collection completion notification message of the information resource on a top layer;

detect, by the operating system, a click operation on the collection completion notification message;

switch, by the operating system, to the system interface; and display, by the operating system, the unified favorite folder on a designated area of the system interface after detecting the click operation on the collection completion notification message;

wherein the key information is located at a top position of the designated area.

12. The device according to claim 10, wherein the circuitry is further configured to:

display, by the operating system, a detail presentation key on the designated area of the unified favorite folder;

detect, by the operating system, a click operation on the detail presentation key; and display, by the operating system, the key information of the plurality of collected information resources stored in the unified favorite folder in an order from most recent to least recent according to collection time after detecting the click operation on the detail presentation key;

wherein key information of most recent collected information resources of the plurality of collected information resources is displayed at a top position of a page, and key information of less recent collected information resources of the plurality of collected information resources is displayed at a bottom position of the page.

13. The device according to claim 12, wherein the circuitry is further configured to:

detect, by the operating system, a sliding operation on the page; and display, by the operating system, in a scrolling manner, key information of information resources that are different from the plurality of collected information resources in the unified favorite folder upon detection of the sliding operation.

14. The device according to claim 10, wherein the circuitry is further configured to:

determine, by the operating system, a number of the plurality of collected information resources displayable on the designated area based on a size of an area that is occupied by the unified favorite folder when the unified favorite folder is displayed;

select, by the operating system, a preset number of the plurality of collected information resources that are most recently collected and match the number of the plurality of collected information resources displayable on the designated area; and display, by the operating system, key information of the preset number of the plurality of collected information resources on the designated area in an order from most recent to least recent according to collection time, wherein key information of most recent collected information resources of the preset number of the plurality of collected information resources is displayed at a top position of the designated area, and key information of less recent collected information resources of the plurality of collected information resources is displayed at a bottom position of the designated area.

15. The device according to claim 14, wherein the circuitry is further configured to:

detect, by the operating system, a select operation that is configured to select one of the preset number of the plurality of collected information resources;

determine, by the operating system, whether the selected information resource is a content of a page;

after detecting the select operation and determining that the selected information resource is the content of the page, determine, by the operating system, an application program from which the selected information resource originates based on address link information corresponding to the selected information resource; and open, by the operating system, the determined application program and displaying the selected information resource through the determined application program.

16. The device according to claim 15, wherein the circuitry is further configured to:

determine, by the operating system, the application program from which the selected information resource originates based on a domain name in the address link information corresponding to the selected information resource, wherein a list of correspondence relations between domain names and application programs is locally saved before determining the application program from which the selected information resource originates.

17. The device according to claim 10, wherein types of information resources including the plurality of collected information resources include at least one of web page content and non-web page content, when the information resource is the web page content, the key information includes title information of the information resource and an accompanying drawing of the information resource, and when the information resource is the non-web page content, the key information includes content keywords of the information resource.

18. The device according to claim 17, wherein the circuitry is further configured to:

detect, by the operating system, a select operation of the information resource;

after detecting the select operation of the information resource, if the information resource is web page content, acquire, by the operating system, the information resource from a second server based on address link information corresponding to the information resource;

re-typeset process, by the operating system, the information resource to obtain the information resource if the information resource is graph-text content;

obtain, by the operating system, the information resource; and display, by the operating system, the information resource if the information resource is graph-text content through a network view assembly.

19. An information resource collection device, comprising:

a processor;

a memory for storing instructions executable by the processor, wherein the processor is configured to:
receive, by an operating system, a broadcast message sent by an application program of a plurality of application programs through a system interface that is configured to direct each of the plurality of application programs to report an occurrence of collection events to the operating system;

analyze, by the operating system, the broadcast message to obtain key information of an information resource;

obtain, by the operating system, the key information of the information resource; and store, by the operating system, the key information of the information resource in a unified favorite folder that is configured to store and display key information of a plurality of collected information resources that has been collected via the system interface from at least one of the plurality of application programs;

for information resources that are present with dynamic updating, with regard to each item of the information resources collected in the unified favorite folder, periodically detect, by the operating system, whether each item of the collected information resources is present with the dynamic updating; and when at least one item of the collected information resources is present with the dynamic updating, display, by the operating system, key information of the at least one item and an updating notification message of the at least one item at a top position of a designated area in which the unified favorite folder is situated.

20. A non-transitory computer-readable storage medium having stored therein computer program instructions that, when executed by one or more processors of a terminal, cause the terminal to:

receive, by an operating system, a broadcast message sent by an application program of a plurality of application programs through a system interface that is configured to direct each of the plurality of application programs to report an occurrence of collection events to the operating system;

analyze, by the operating system, the broadcast message to obtain key information of an information resource;

obtain, by the operating system, the key information of the information resource;

store, by the operating system, the key information of the information resource in a unified favorite folder that is configured to store and display key information of a plurality of collected information resources that has been collected via the system interface from at least one of the plurality of application programs;

for information resources that are present with dynamic updating, with regard to each item of the information resources collected in the unified favorite folder, periodically detect, by the operating system, whether each item of the collected information resources is present with the dynamic updating; and when at least one item of the collected information resources is present with the dynamic updating, display, by the operating system, key information of the at least one item and an updating notification message of the at least one item at a top position of a designated area in which the unified favorite folder is situated.

* * * * *